(12) United States Patent
Murrell

(10) Patent No.: US 6,655,706 B1
(45) Date of Patent: Dec. 2, 2003

(54) EXTENDABLE-RETRACTABLE RV STEP AND METHOD OF ASSEMBLING SAME

(75) Inventor: Jonathan Murrell, Van Buren, AR (US)

(73) Assignee: Hickory Springs Manufacturing Company, Hickory, NC (US)

( * ) Notice: Subject to any disclaimer, the term of this patent is extended or adjusted under 35 U.S.C. 154(b) by 104 days.

(21) Appl. No.: 10/046,381

(22) Filed: Oct. 26, 2001

(51) Int. Cl.[7] ................................................. B60R 3/02
(52) U.S. Cl. ........................ 280/166; 280/169; 182/88; 182/91
(58) Field of Search ................................ 280/169, 163, 280/166; 182/127, 91, 88

(56) References Cited

U.S. PATENT DOCUMENTS

| | | | | |
|---|---|---|---|---|
| 1,148,356 A | * | 7/1915 | Chickering | 182/88 |
| 2,142,949 A | * | 1/1939 | Linker | 182/88 |
| 2,153,945 A | * | 4/1939 | Thelander | 182/88 |
| 2,642,217 A | * | 6/1953 | Jennings | 182/88 |
| 2,747,888 A | * | 5/1956 | Jones | 182/88 |
| 2,764,422 A | * | 9/1956 | McDonald | 182/91 |
| 2,971,600 A | * | 2/1961 | Schultz | 182/88 |
| 3,515,406 A | | 6/1970 | Endlsey, Jr. | 280/166 |
| 3,915,475 A | * | 10/1975 | Casella et al. | 280/166 |
| 3,955,827 A | * | 5/1976 | Wonigar | 280/166 |
| 4,106,790 A | * | 8/1978 | Weiler | 280/166 |
| 4,110,673 A | * | 8/1978 | Magy et al. | 318/466 |
| 4,116,457 A | | 9/1978 | Nerem et al. | 280/166 |
| 4,198,070 A | * | 4/1980 | Weiler | 280/166 |
| 5,205,603 A | * | 4/1993 | Burdette, Jr. | 296/62 |
| 5,228,707 A | * | 7/1993 | Yoder | 280/166 |
| 5,342,073 A | | 8/1994 | Poole | 280/166 |
| 5,660,405 A | * | 8/1997 | Campbell | 280/166 |
| 5,697,470 A | * | 12/1997 | Carle | 182/88 |
| 6,082,751 A | * | 7/2000 | Hanes et al. | 280/163 |
| 2002/0079668 A1 | * | 6/2002 | Farkash | 280/163 |
| 2003/0042700 A1 | * | 3/2003 | Ueno | 280/166 |

* cited by examiner

Primary Examiner—Brian L. Johnson
Assistant Examiner—J. Allen Shriver
(74) Attorney, Agent, or Firm—Kennedy Covington Lobdell & Hickman, LLP

(57) ABSTRACT

An extendable-retractable step system for a recreational vehicle (RV) has a step tread attached to a slider rod via side arms that include one or more locking tabs, and includes a pair of end plates having tab-receiving slots and notched slider slots that define extended and retracted positions. A method of assembling the step system and mounting same to a vehicle frame without using specially adapted tools includes the steps of mounting one of the end plates to the vehicle frame, inserting the ends of the slider rod into the slider slots, mounting the other end plate to the vehicle frame, and resting the locking tabs in the tab-receiving slots.

4 Claims, 8 Drawing Sheets

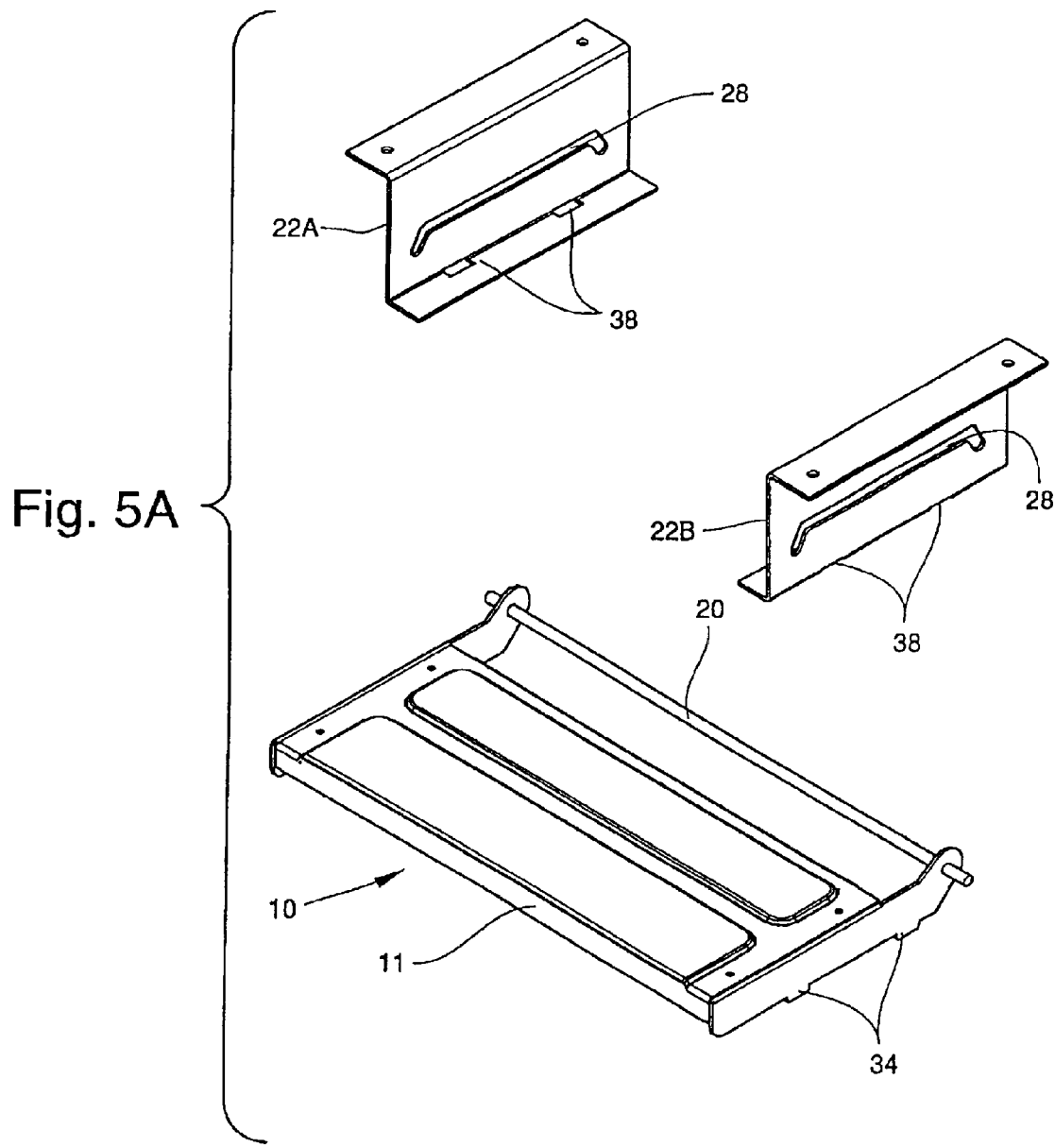

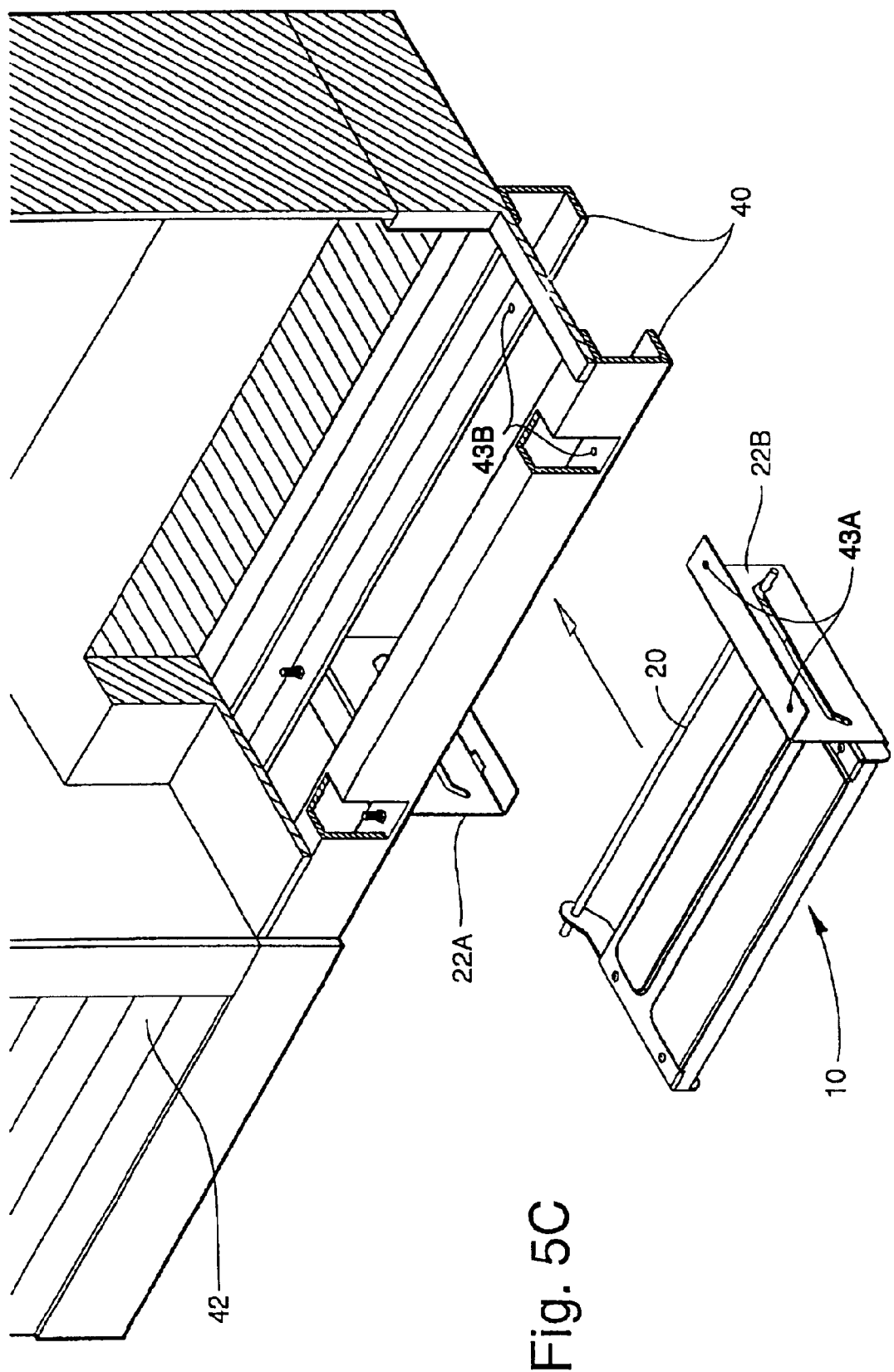

EXTENDABLE-RETRACTABLE RV STEP AND METHOD OF ASSEMBLING SAME

FIELD OF THE PRESENT INVENTION

The present invention relates to a step for a recreational vehicle and, more particularly, to a retractable-extendable step permitting ingress into and egress from a recreational vehicle and a method of assembling same.

BACKGROUND OF THE PRESENT INVENTION

Recreational vehicles (RVs) are a well known part of American life and come in many different configurations. Some are stand-alone units, possessing all the elements of an ordinary vehicle in addition to a living and sleeping quarters. Others must be towed behind a conventional vehicle, usually by means of a tongue-and-ball system, a hitch system, or a fifth-wheel and kingpin system. In any event, however, all RVs are characterized by their dual nature—on one hand, a living and sleeping quarters; on the other, a moving vehicle.

The use of the RV as a living and sleeping quarters is much enhanced by facilitating easy ingress into and egress from the interior of the RV when it is stationary. Because the floor of the RV may be quite a distance (more than a usual stepping height of 8 to 12 inches) from the ground outside the RV, a step may be provided at a level intermediate the ground and the door sill in order to ease ingress and egress. Such a step is typically mounted to the RV frame for stability and is best provided at a point somewhat outside the vertical plane formed by the side of the RV, so that a person exiting the RV may step through the door while facing forward.

However, a step fixed at a location outside the vertical plane formed by the side of the RV poses an obvious hazard when the RV is in motion, such as on a highway. For that reason, it is helpful to have a step that may be extended when the vehicle is stationary, and retracted when the vehicle is in motion. Various steps capable of this function have been proposed. For instance, Wonigar, U.S. Pat. No. 3,955,827, discloses a stowable step for vehicles, the stowing action of which is accomplished by a system of slotted supports and links which work to fold the step under the vehicle. The system of U.S. Pat. No. 3,955,827, however, is complicated, using many moving parts to accomplish this stowing function. Other typical systems are likewise complicated. They may require specialized tools to assemble or attach them to the frame. They may be sufficiently complicated that it is practical only to assemble the entire system at the point of manufacture, which leads to increased costs for shipping the unit or for attaching it to the RV frame. Additionally, they may be susceptible to breakdown or malfunction because of the failure of one of many parts.

A subsidiary problem associated with the retracting and extending function of the step is the need to keep the step in the desired position while maintaining ease of movement between the retracted and extended positions when such movement is desired. For instance, when the RV is in motion, bumps or sharp turns in the roadway might induce the step to move unexpectedly from the retracted position, creating a hazard. Alternatively, when the RV is stationary, a person stepping onto the step might be injured if the stepping force caused the step to move unexpectedly toward the retracted position.

It is therefore desirable to have a step that includes relatively few moving parts, that may be assembled remotely from the point of manufacture and assembled and attached to the frame without the use of specially adapted tools, and which is capable of being placed and maintained in either a retracted or extended position.

OBJECT AND SUMMARY OF THE PRESENT INVENTION

It is accordingly an object of the present invention to provide a step system of relatively simple design, which is mountable to an RV frame and is retractable and extendable as well as able to be maintained or locked in a retracted or extended position. It is a further object of the present invention to provide such a step with parts in disassembled relation, in order to minimize shipping and inventory costs, but which may be assembled without using complicated procedures or specially adapted tools.

It is yet a further object of the invention to provide a method of assembling a step for a recreational vehicle and mounting the step to a vehicle frame, the method being accomplished without specially adapted tools and resulting in a step that is securely mounted to the frame and movable between and lockable at retracted and extended positions.

Briefly summarized, the present invention includes a step mountable to an RV frame, generally including a step tread unit with a slider rod and at least one locking tab, and a pair of end plates, each slotted to receive an end of the slider rod and to receive a locking tab. The present invention further includes a method of assembling a step for an RV without using specially adapted tools, generally including the steps of mounting one of the end plates to the RV frame, inserting opposite ends of the slider rod into slider slots in the end plates, and then mounting the second end plate to the RV frame. The method of the present invention is capable of being performed by persons of limited mechanical skill and training possessing only ordinary tools, enabling it to be practiced remotely from the point of manufacture of the step.

BRIEF DESCRIPTION OF THE DRAWINGS

Further features, embodiments, and advantages of the present invention will become apparent from the following detailed description with reference to the drawings, wherein:

FIGS. 5A–5D illustrate the sequence of steps of the method of the present invention.

DETAILED DESCRIPTION OF PREFERRED EMBODIMENTS

Figure 1:
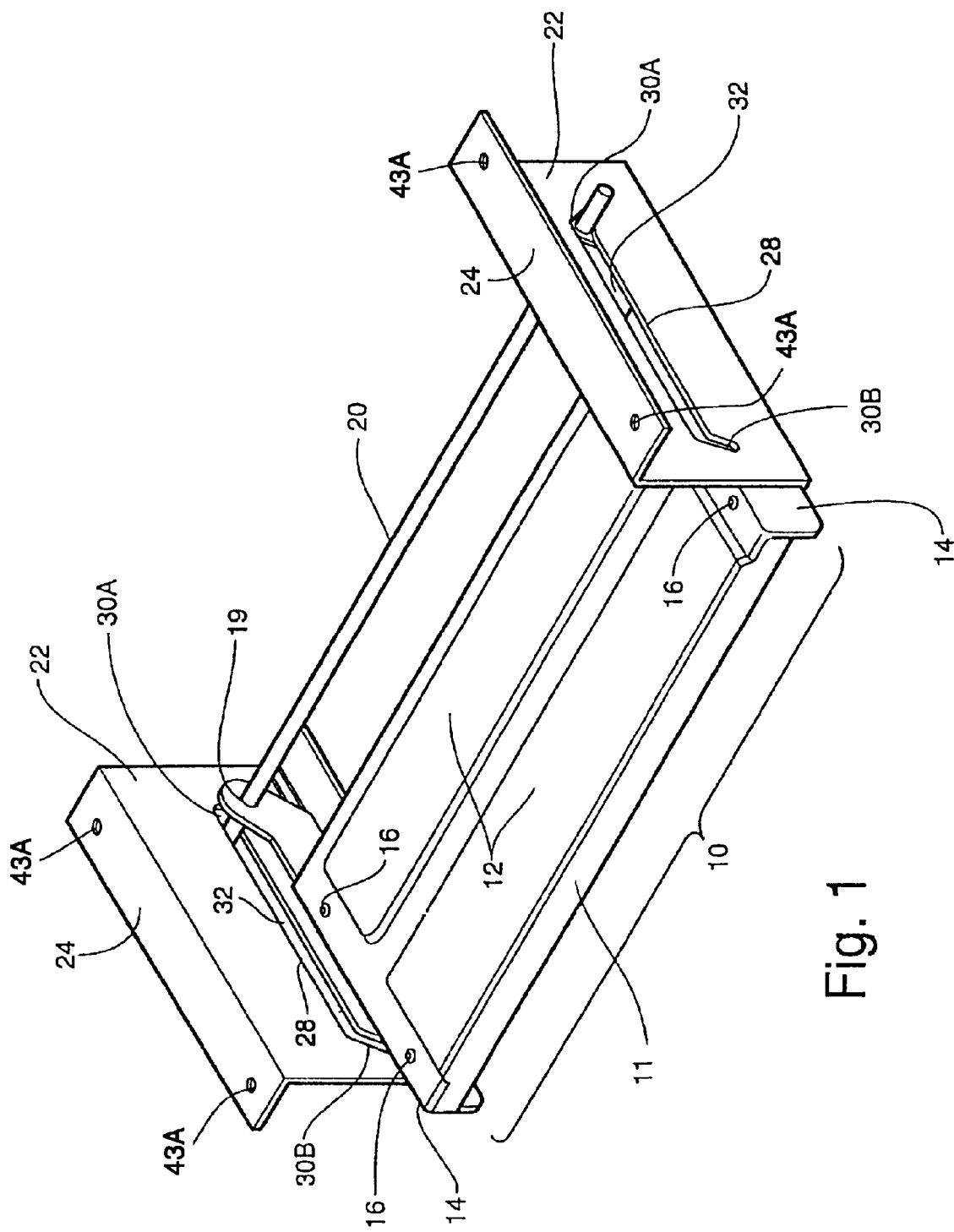
FIG. 1 is a perspective view of an assembled step system in the retracted position.
Figure 2:
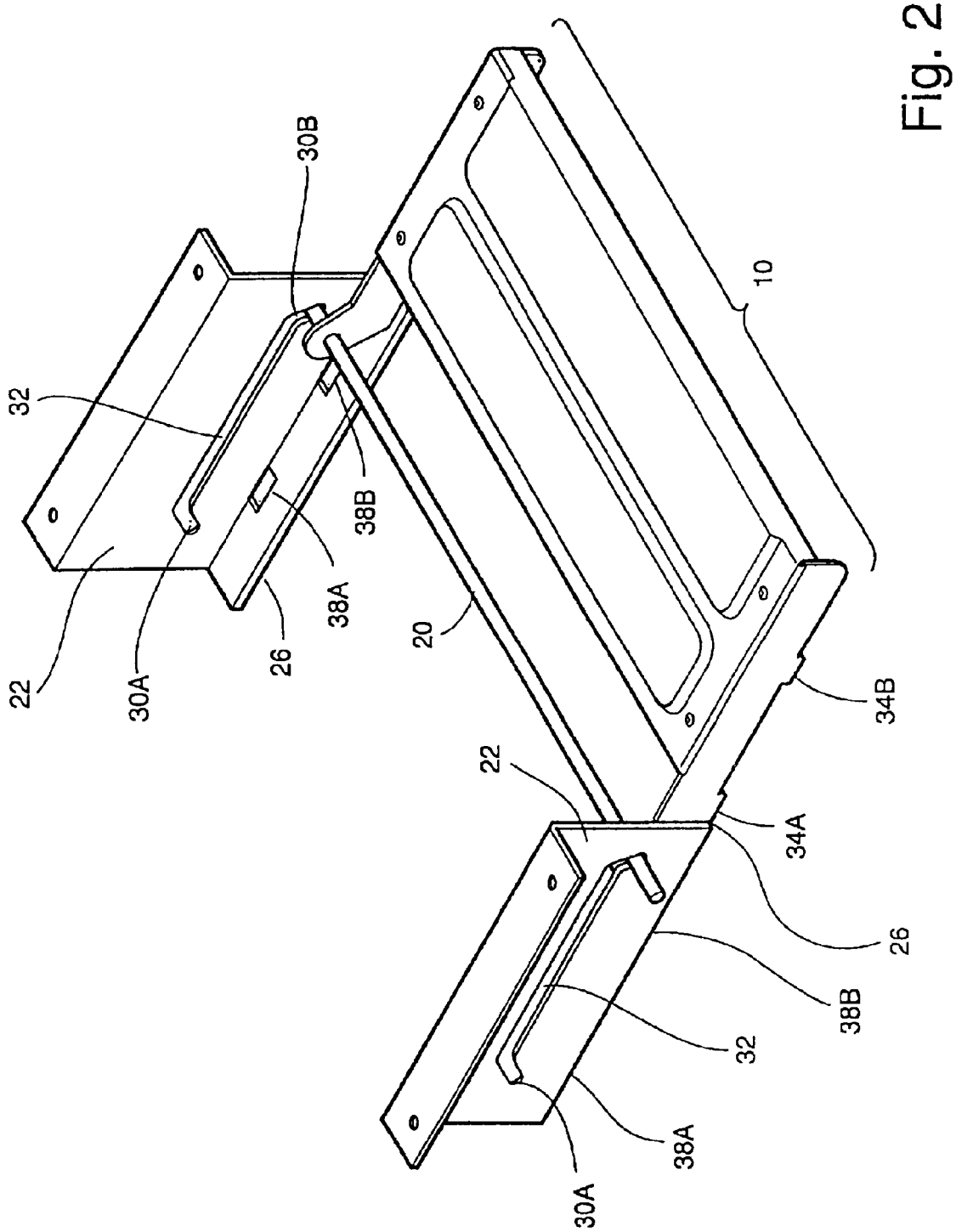
FIG. 2 is a perspective view of an assembled step system in the extended position.

Referring now to the drawings, a first preferred embodiment of the present invention is shown in a retracted position in FIG. 1 and in an extended position in FIG. 2. The step system of FIG. 1 has a step tread unit 10, which comprises step tread 11, upon which are affixed one or more strips 12, which improve the safety or comfort of use of the step. Strips 12 may be formed generally of a grit-type material fused to a backing, which may be attached to step tread 11 by means of an adhesive or by any other suitable means. Alternatively, strips 12 may be formed of rubber, plastic, or a padding material. Step tread unit 10 includes a pair of side arms 14 which extend downwardly and rearwardly from opposite ends of step tread 11. Side arms 14 may be formed as a unitary part of step tread 11, or they may be formed from a different piece of material and attached to step tread 11 by means of rivets 16, welding (not shown), nuts and bolts (not shown), or any other suitable attaching means. The rear ends of side arms 14 are angled upward and are formed with holes 19 to receive slider rod 20. Slider rod 20 extends transversely behind step tread unit 10 beyond side arms 14. Left and right end plates 22 each have a top flange 24 extending orthogonally to the main, vertical portion of the end plate 22. Each top flange 24 has one or more holes 43A for attaching end plate 22 to a vehicle frame 40 (FIGS. 4 and 5B–5D), the attachment being accomplished using nuts and bolts, rivets, or other suitable means as more fully described hereinafter. Each end plate 22 is formed with a slider slot 28 adapted to receive an end of slider rod 20, which extends therethrough. Slider slot 28 has a main elongate horizontal portion 32 defining a path of travel of slider rod 20 between retracted and extended positions, which are defined by a downwardly extending rear notch 30A and a downwardly extending front notch 30B at opposite ends of the main elongate horizontal portion 32.

FIG. 2 illustrates a step system as in FIG. 1 in an extended position. Step tread unit 10 has been lifted so that slider rod 20 exits rear notch 30A, slides along elongate portion 32, and comes to rest in front notch 30B, the step system thereby being in the extended position. Visible in this extended position are several features of a preferred embodiment not visible in FIG. 1. A pair of locking tabs 34A,34B extend downwardly from the bottom edge of each side arm 14. Each end plate 22 has an orthogonal bottom flange 26 extending under the path of motion of step tread unit 10. Each bottom flange 26 has tab-receiving slots 38A,38B corresponding in number and in spacing to locking tabs 34A,34B, which are adapted to engage with tab-receiving slots 38A,38B when the step system is in the retracted position in order to reduce the likelihood of unwanted movement of the step system out of the retracted position. Each locking tab 34A is further disposed so as to abut the forward edge of the respective bottom flange 26 when the step system is in the extended position and slider rod 20 is received in front notch 30B. The abutment of locking tab 34A with bottom flange 26, in combination with the weight of the step tread unit urging slider rod 20 to seat in front notch 30B and the downward additional pressure of a person (not shown) stepping on step tread unit 10, prevents unwanted movement of the step system out of the extended position.

Figure 3:
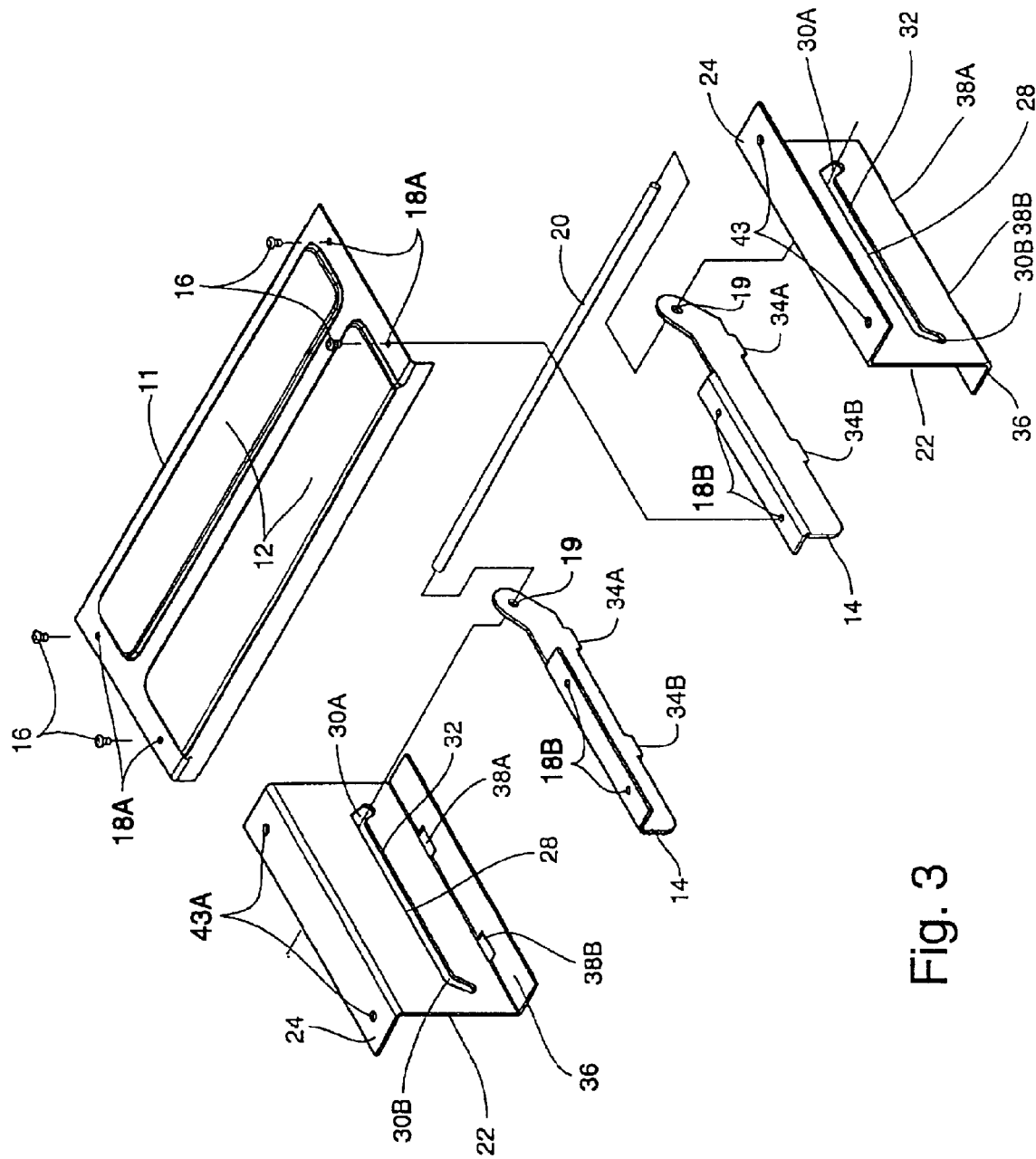
FIG. 3 is a perspective view of the components of the step system in exploded relation.

Referring now to FIG. 3, the step system of FIG. 1 is shown with the members thereof in exploded relation. Step tread 11 is provided with pair of strips 12 for increasing the safety or comfort of use of the step system. A pair of side arms 14 are connectable to step tread 11 by means of rivets 16 through holes 18A, 18B and extend under and behind step tread 11. Side arms 14 are each provided with a pair of locking tabs 34A,34B and angle behind step tread 11 to receive, through holes 19, slider rod 20. Slider rod 20 is of sufficient length to extend beyond side arms 14 through slider slots 28 in end plates 22. Slider slots 28 each comprise an elongate portion 32, defining a traveling path of slider rod 20 between retracted and extended positions, intermediate a pair of notches 30A,30B. End plates 22 are each further provided with a top flange 24 and a bottom flange 36. Top flange 24 is formed with holes 43A through which end plate 22 may be attached to the vehicle frame, as explained below. Bottom flange 36 is formed with tab-receiving slots 38A, 38B corresponding to locking tabs 34A,34B. Notches 30A, 30B, locking tabs 34A,34B, and tab-receiving slots 38A, 38B are disposed such that when slider rod 20 is in notch 30, locking tabs 34A,34B engage with tab-receiving slots 38A, 38B to prevent unwanted motion of the step system out of the retracted position. Notch 30B, locking tab 34A, and bottom flange 36 are further disposed such that when slider rod 20 is engaged with notch 30B, locking tab 34A abuts the forward edge of bottom flange 36 so as to prevent unwanted motion of the step system out of the extended position.

As can be seen in FIG. 3, each bottom flange is provided with two tab-receiving slots 38A,38B and each side arm 14 is provided with two locking tabs 34A,34B. However, it is possible to vary the number of locking tabs 34 and tab-receiving slots 38 according to the desired degree of system stability. For instance, each side arm 14 could be provided with one, three, or more locking tabs 34 and each bottom flange 36 could be provided with a corresponding number of tab-receiving slots 38. Alternatively, only one of the side arms 14. and one of the bottom flanges 36 could be provided with locking tabs and tab-receiving slots. It will be apparent to one skilled in the art to which the present invention relates that the particular number of locking tabs and tab-receiving slots is less important than the fact of their presence in the present invention.

As can also be seen in FIG. 3, end plates 22, though oriented opposite from each other when the step system is assembled, are in a preferred embodiment identical to each other in the placement of top and bottom flanges 24, holes 43A, slider slots 28, notches 30A,30B, elongate portions 32, and tab-receiving slots 38A,38B. Such a design choice may yield a substantial advantage in reducing design, production, and shipping cost.

Figure 4:
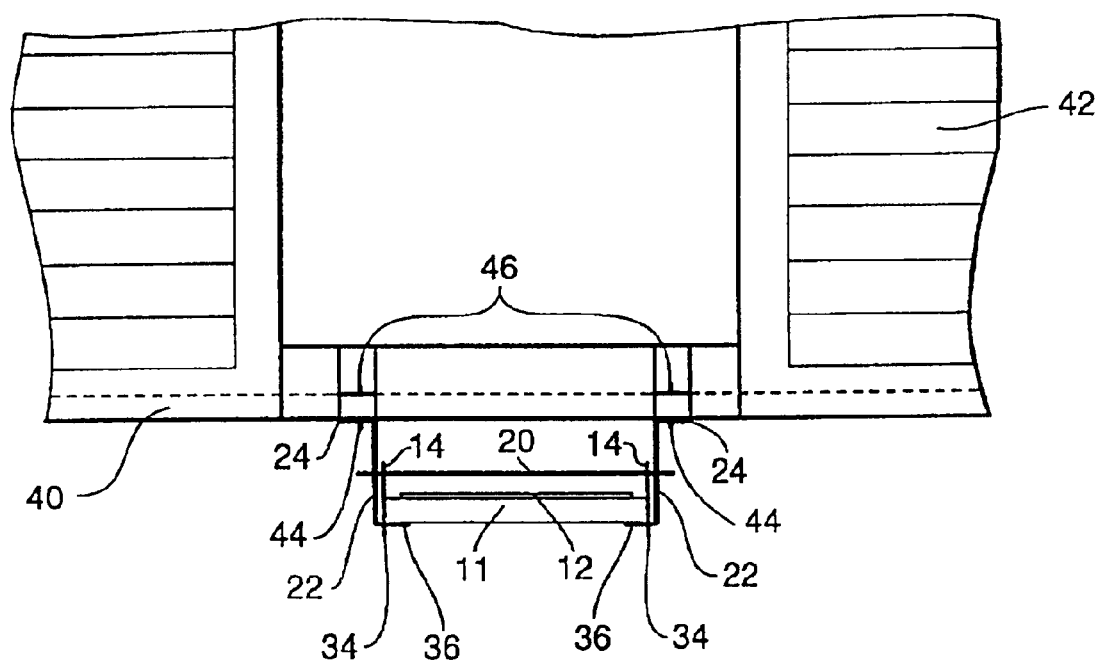
FIG. 4 is a partial perspective view of an assembled step system mounted to a recreational vehicle frame.

Referring now to FIG. 4, the step system of FIGS. 1–3 is shown in fully assembled relation, attached to frame 40 (indicated by dashed lines) of recreational vehicle 42 by means of bolts 44 and nuts 46 and placed in the retracted position.

Figure 5B:
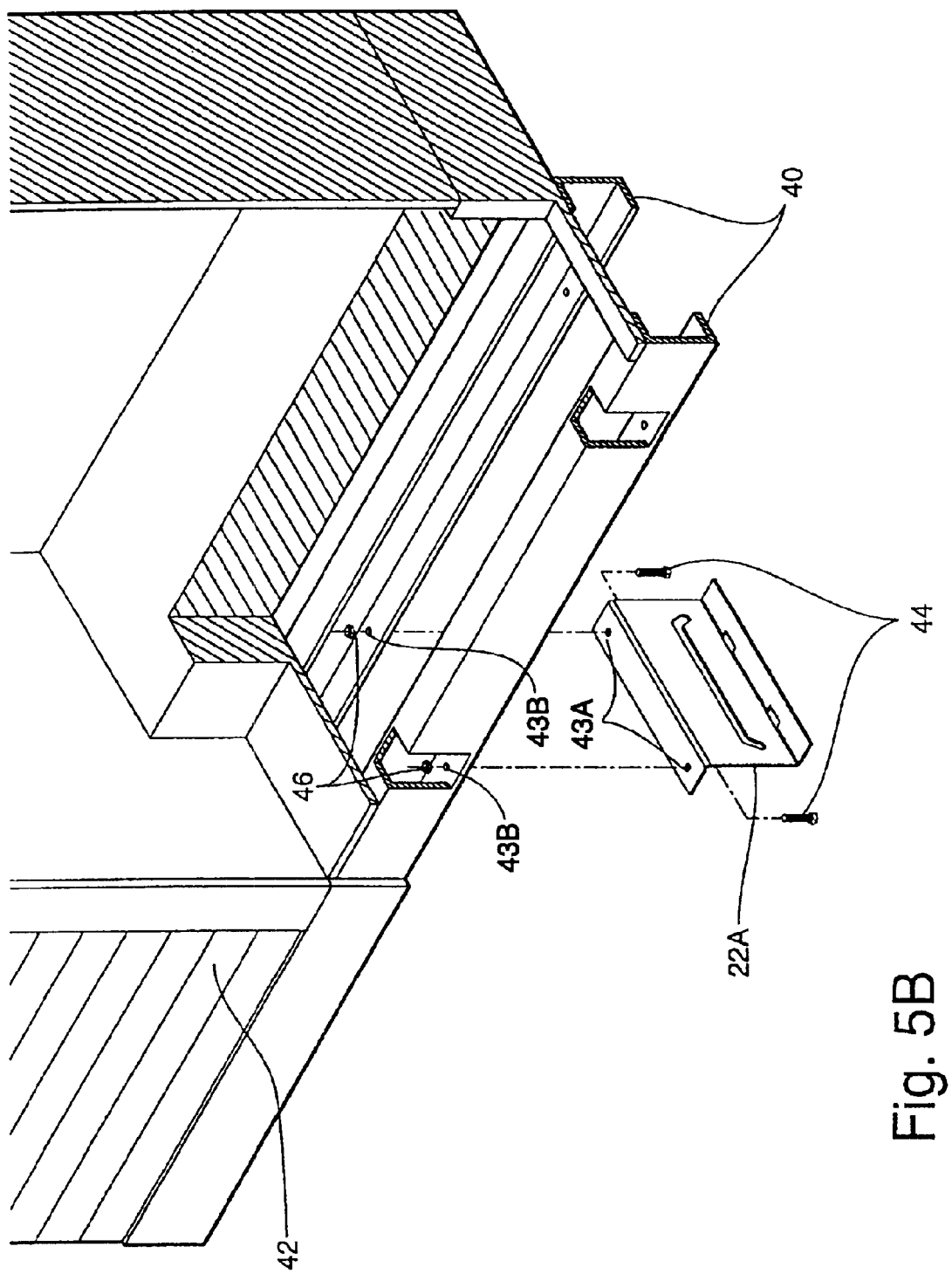
Figure 5D:
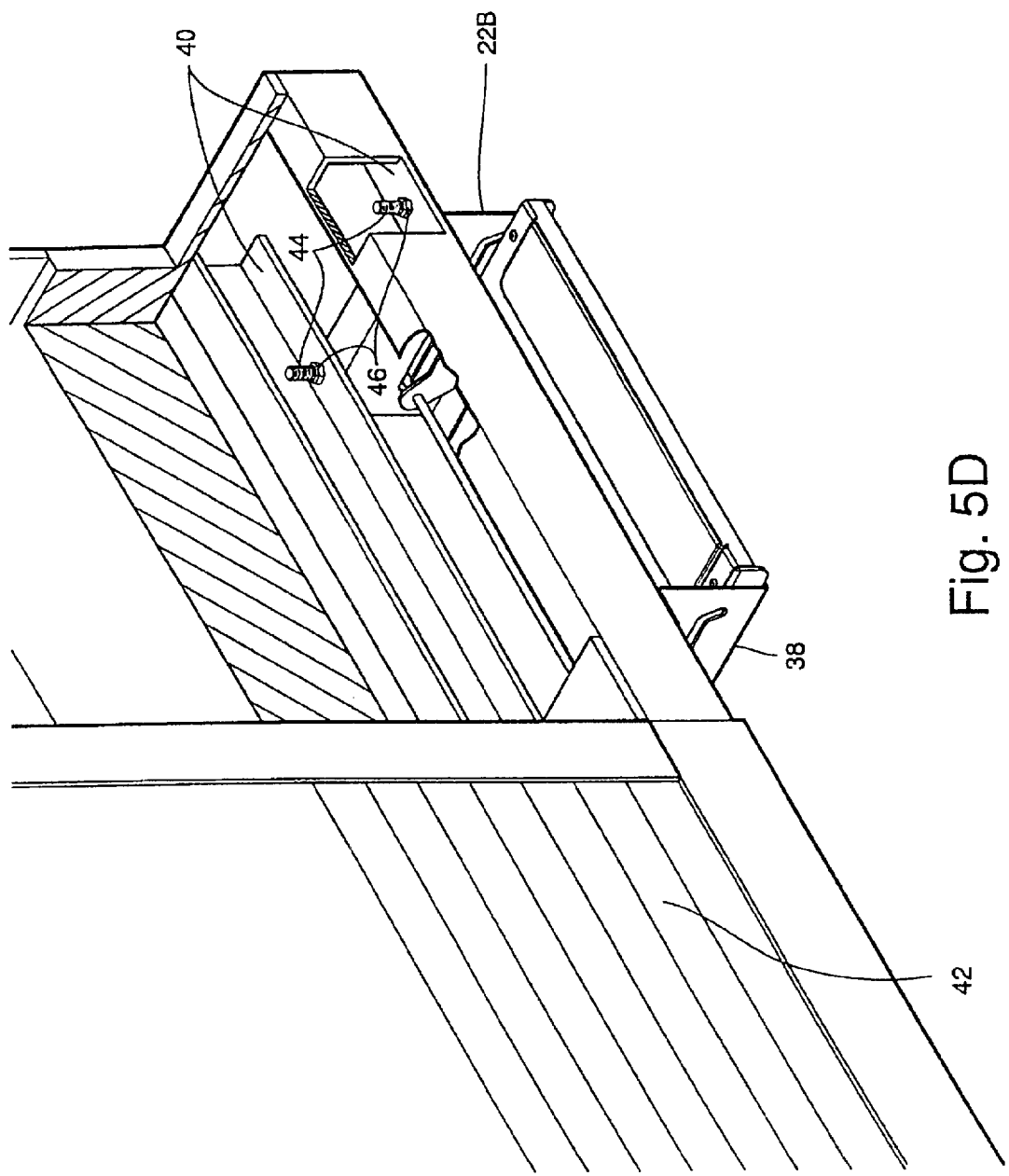

It will be apparent to those skilled in the art that the simplicity of the step system of the present invention makes it suitable to a particular method of assembling the step system and attaching the step system to the frame of a recreational vehicle, the method forming part of the present invention. Referring now to FIGS. 5A–5D, the steps of the method of assembling and attaching a step to a recreational vehicle are shown in particular detail. FIG. 5A shows a step for a recreational vehicle, comprising in disassembled relation left and right end plates 22A,22B, each formed with a slider slot 28 and at least one tab-receiving slot 38, and a step tread unit 10, generally comprising a step tread 11, at least one locking tab 34, and a slider rod 20 attached thereto. FIG. 5B shows left end plate 22A being initially mounted to vehicle frame 40 by placing bolts 44 through holes 43A, 43B and securing with nuts 46. FIG. 5C shows one end of slider rod 20 inserted through right end plate 22B, and the opposite end of slider rod 20 is inserted through left end plate 22A. FIG. 5D shows right end plate 22B mounted to vehicle frame 40 by placing bolts 44 through holes 26A,26B (best seen in FIG. 5C) and securing with nuts 46. Locking tabs 34 (best seen in FIG. 5A) are then rested in tab-receiving slots 38. As can be seen most clearly in FIGS. 5B–5D, the step system is, by the method of the present invention, mounted at a point of ingress into and egress from a recreational vehicle, and the assembly and mounting of the step system may be accomplished substantially simultaneously.

It will be apparent to those skilled in the art to which the present invention relates that the step system and method of assembling and attaching same to an RV frame are suited to a number of particular commercial advantages. First, the relative simplicity of the design reduces the costs of producing and servicing the step system. Second, providing the components of the step system in disassembled or partially assembled relation enables like individual components to be shipped together, decreasing the amount of packing space that would be wasted if the irregularly shaped step system were shipped fully assembled. Third, because the step system may be assembled and attached without the use of specialized tools, using ordinary means of attachment, it is possible for the system to be assembled and attached at points remote from the point of manufacture, making the step system suitable for offering by RV dealers or manufacturers as an optional feature or as an after-market item available to be purchased and installed by individual owners of RVs.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A step system for a recreational vehicle, comprising:

a step tread unit comprising at least one locking tab at an at least one end of the step tread unit;

a first end plate adapted to receive a first end portion of the step tread unit; and a second end plate adapted to receive a second end portion of the step tread unit;

wherein the first and second end plates each comprise a flange extending under the step tread unit and the flange of at least one of the end plates comprises at least one tab-receiving slot adapted to receive the at least one locking tab; said step system may be substantially simultaneously assembled and mounted to a frame of the recreational vehicle.

2. A step system for a recreational vehicle, comprising:

a step tread unit comprising at least one locking tab at an at least one end of the step tread unit, the at least one locking tab extending downwardly from each of opposite ends of the step tread unit;

a first end plate adapted to receive a first end portion of the step tread unit; and a second end plate adapted to receive a second end portion of the step tread unit; wherein the first and second end plates each comprise a flange extending under the step tread unit and each flange comprises at least one tab-receiving slot adapted to receive a respective one of the locking tabs; said step system may be substantially simultaneously assembled and mounted to a frame of the recreational vehicle.

3. A step system for a recreational vehicle, comprising:

a step tread unit comprising at least one locking tab at an at least one end of the step tread unit, the at least one locking tab extending downwardly from each of opposite ends of the step tread unit;

a first end plate adapted to receive a first end portion of the step tread unit; and a second end plate adapted to receive a second end portion of the step tread unit; wherein the first and second end plates each comprise a flange extending under the step tread unit and each flange comprises at least one tab-receiving slot adapted to receive a respective one of the locking tabs, the locking tabs and the tab-receiving slots being situated to define a retracted position of the step tread unit, at which each locking tab engages the respective tab-receiving slot, and an extended position of the step tread unit, at which each locking tab abuts an edge of the respective-flange; said step system may be substantially simultaneously assembled and mounted to a frame of the recreational vehicle.

4. A step system for a recreational vehicle, comprising:

a step tread unit comprising a slider bar and at least one locking tab extending downward from at least one end of the step tread unit;

a first end plate adapted to receive a first end portion of the step tread unit; and a second end plate adapted to receive a second end portion of the step tread unit; wherein the first and second end plates each comprise a slider slot adapted to receive the slider bar, each slider slot comprising an elongate portion intermediate a plurality of notches, the notches defining at least a retracted position and an extended position, and a flange extending under the step tread unit, at least one of the flanges comprising at least one tab-receiving slot positioned correspondingly to the at least one locking tab and adapted to receive the at least one locking tab so that the at least one locking tab engages the at least one tab-receiving slot at the retracted position and the at least one locking tab abuts an edge of one of the flanges at the extended position; said step system may be substantially simultaneously assembled and mounted to a frame of the recreational vehicle.

* * * * *